US009574673B2

(12) United States Patent
Ringer

(10) Patent No.: US 9,574,673 B2
(45) Date of Patent: Feb. 21, 2017

(54) VALVE FOR FIRE PROTECTION

(71) Applicant: Yoram Ringer, Providence, RI (US)

(72) Inventor: Yoram Ringer, Providence, RI (US)

(*) Notice: Subject to any disclaimer, the term of this patent is extended or adjusted under 35 U.S.C. 154(b) by 122 days.

(21) Appl. No.: 14/614,379

(22) Filed: Feb. 4, 2015

(65) Prior Publication Data

US 2015/0219233 A1 Aug. 6, 2015

Related U.S. Application Data

(60) Provisional application No. 61/936,441, filed on Feb. 6, 2014.

(51) Int. Cl.
*F16K 31/00* (2006.01)
*F16K 7/12* (2006.01)
*A62C 35/68* (2006.01)

(52) U.S. Cl.
CPC ............ *F16K 7/12* (2013.01); *A62C 35/68* (2013.01); *Y10T 137/7922* (2015.04)

(58) Field of Classification Search
CPC ....... F16K 7/126; F16K 7/12; Y10T 137/7922
USPC .......................................... 251/61, 61.1, 331
See application file for complete search history.

(56) References Cited

U.S. PATENT DOCUMENTS

| | | | | |
|---|---|---|---|---|
| 3,802,462 A | * | 4/1974 | Trosch | F16K 7/126 137/556 |
| 5,632,465 A | * | 5/1997 | Cordua | F16K 7/126 251/30.02 |
| 6,095,484 A | * | 8/2000 | Frenkel | F16K 7/126 137/488 |
| 7,059,578 B2 | * | 6/2006 | Frenkel | F16K 31/145 251/61.1 |
| 7,201,187 B2 | * | 4/2007 | Irwin | F16K 7/17 137/625.28 |
| 7,527,241 B2 | * | 5/2009 | Lodolo | F16K 7/126 137/540 |
| 8,281,810 B2 | | 10/2012 | Feenstra et al. | |
| 8,616,234 B2 | | 12/2013 | Ringer et al. | |
| 2010/0071776 A1 | * | 3/2010 | Ringer | F16K 7/126 137/12 |
| 2014/0077108 A1 | * | 3/2014 | Ringer | F16K 7/126 251/61.1 |
| 2014/0264104 A1 | | 9/2014 | Ringer et al. | |
| 2015/0219233 A1 | | 8/2015 | Ringer | |

FOREIGN PATENT DOCUMENTS

WO WO2008051871 5/2008

* cited by examiner

*Primary Examiner* — Umashankar Venkatesan
(74) *Attorney, Agent, or Firm* — Sahlom Wertsberger; Saltamar Innovations

(57) ABSTRACT

One aspect of the invention provides a diaphragm valve having a plurality of sealing members disposed on the diaphragm, the plurality of sealing member and the seat define two intermediate chambers, coupled to at least one and potentially more, alarm port, to alert of leakage of fluid from the inlet side and/or the outlet side.
A second aspect of the invention provides at least one angled lip disposed to improve the seal quality of any diaphragm valve. The angled lip enjoys increased sealing responsive to increased pressure of the fluid it seals against. The angled lip may be disposed on the inlet side, he outlet side, or both. In certain embodiments the lip is utilized in a diaphragm having two sealing member forming a single intermediate chamber therebetween when the valve is in the closed condition.

21 Claims, 13 Drawing Sheets

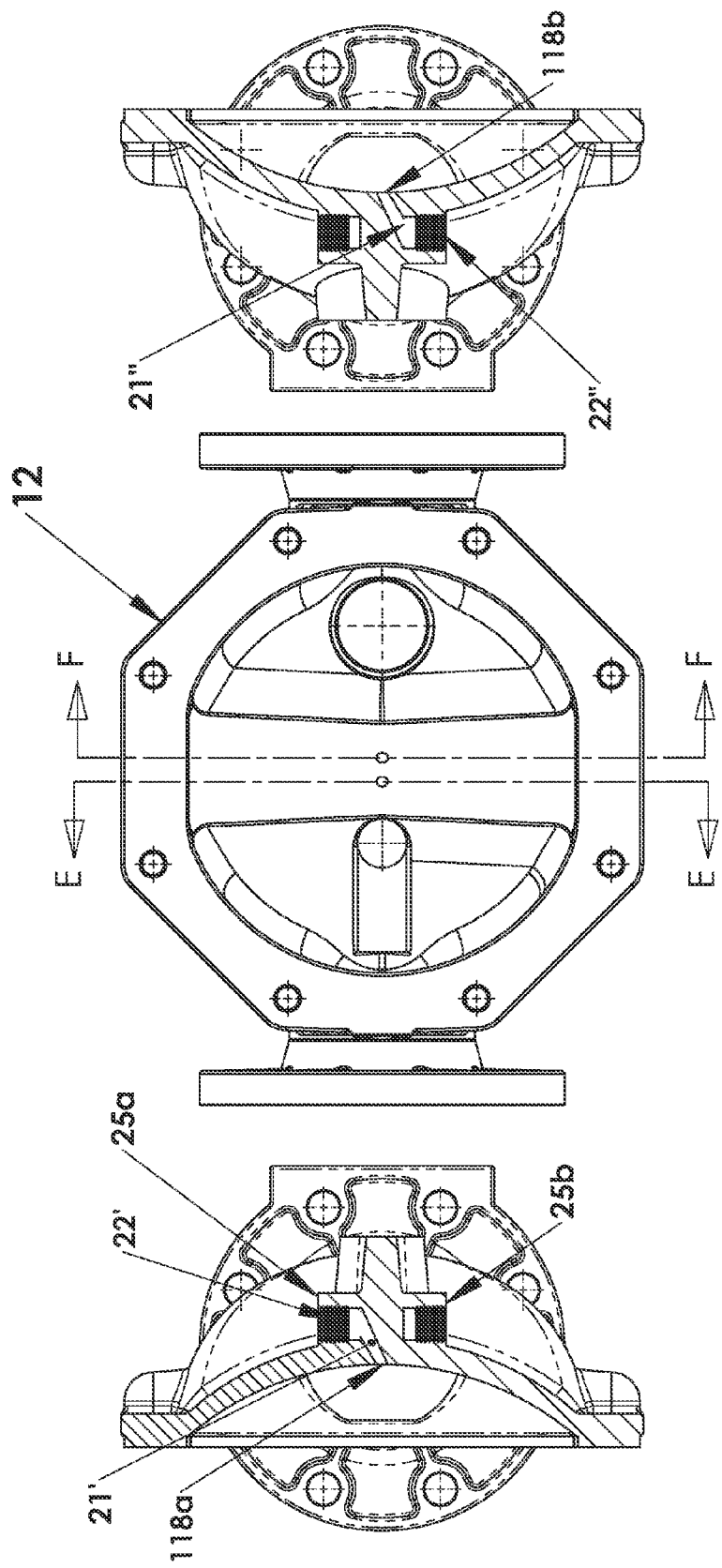

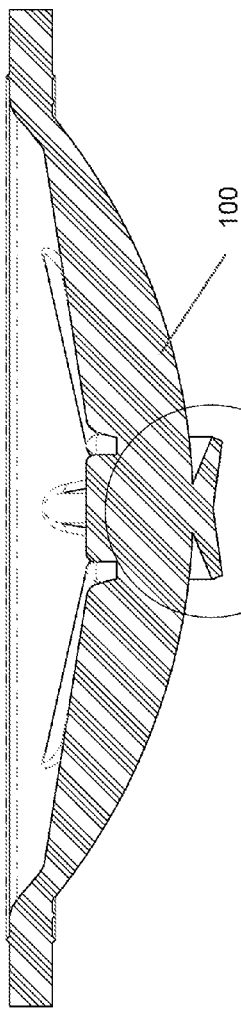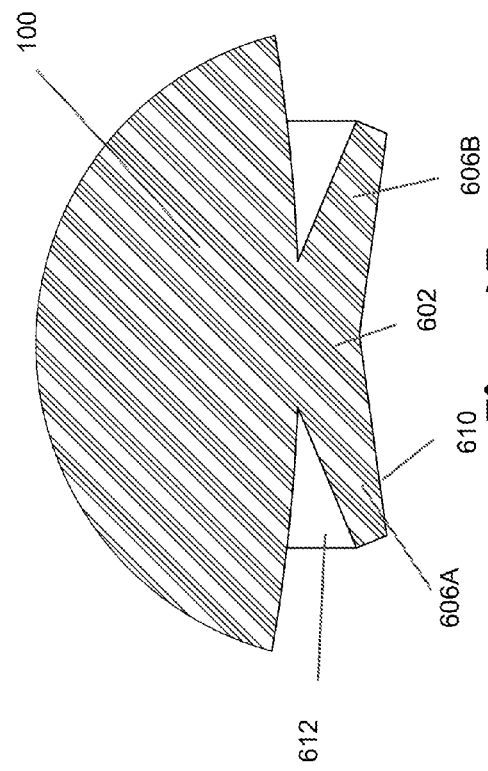

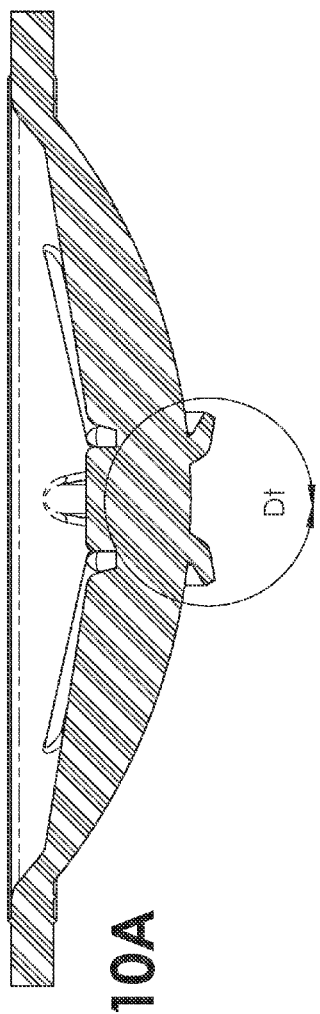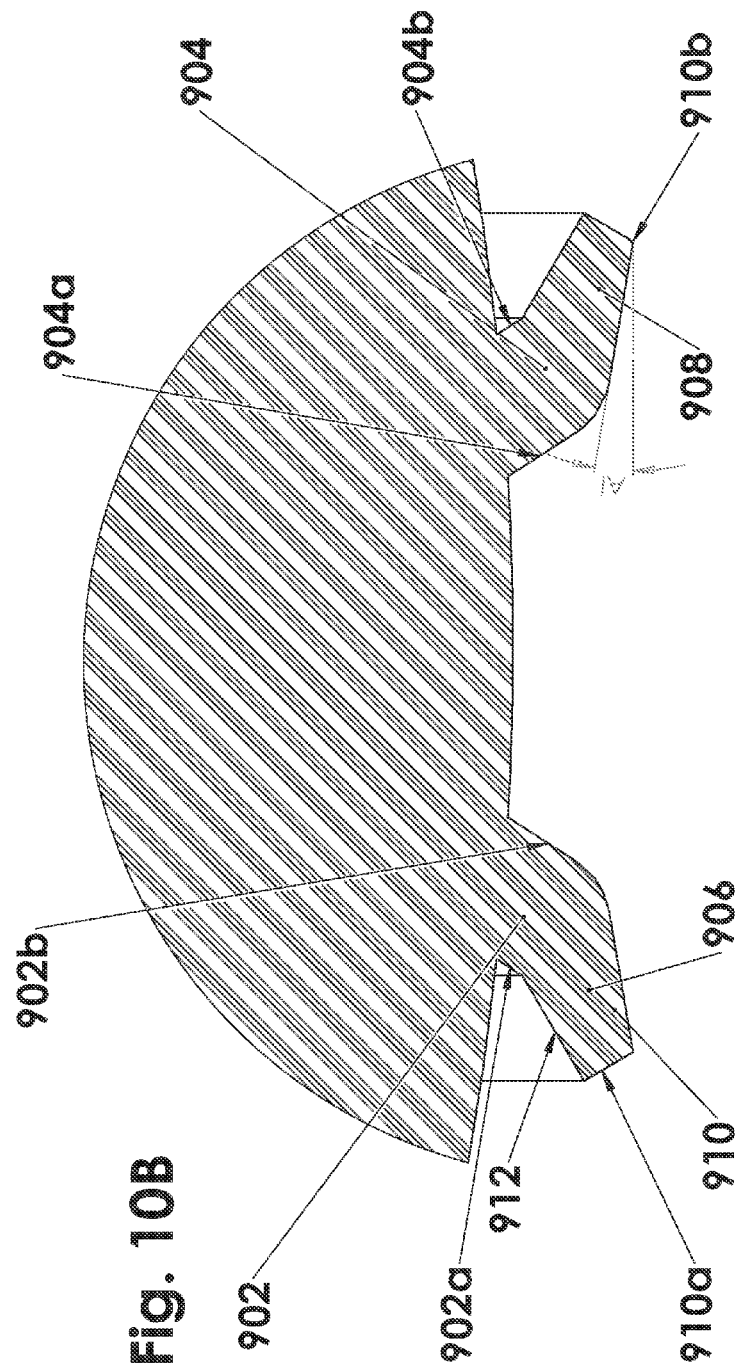
Fig. 10A
Fig. 10B

VALVE FOR FIRE PROTECTION

RELATED APPLICATIONS

This application claims the benefit of priority of US provisional patent application No. 61/936,441, filed Feb. 6, 2014. The '441 application is being incorporated herein by reference in its entirety.

FIELD OF THE INVENTION

The present invention is directed generally to fire protection systems and more particularly to improved valves and alarm systems in fire protection systems.

BACKGROUND

In the field of fire protection, most valves are based on two basic valve principles: the clapper design and the diaphragm design. A base valve may be utilized for different functions and/or systems, such as deluge, wet system, dry/pre-action valves, pressure reducing, deluge reducing and deluge on/off applications. The base valve is configured to fulfill those varied functions by external connections and components, collectively known as 'trim'. Historically, the clapper valve has been most common, however, in recent years, with the introduction of special fire protection applications, the trend is more towards use of the diaphragm design. The base valve has at least a valve body, an inlet in fluid communication with an inlet chamber which can hold a fluid supply, and an outlet chamber which can receive fluid from the inlet chamber and pass the fluid to an outlet. The fluid in the input will be referred to herein as a 'primary' fluid. A valve may be in a "closed", or "standby" state where the valve impedes flow of fluid between the inlet and outlet, and an "opened", or "activated" state in which fluid communication is established between the input and output chambers, and fluid is allowed to flow between the input and the output. In a clapper valve the input chamber is cupped by a clapper that is mechanically held closed during the standby state and the clapper is released in the open state. The clapper valve will stay in the open state, until it is manually reset, therefore it cannot be operated as an on/off valve which requires an automatic reset.

Diaphragm valves have a diaphragm chamber in addition to the input and output chambers. When the diaphragm chamber is pressurized, the pressure in the diaphragm chamber causes the diaphragm to move to a closed state in which a sealing portion of the diaphragm impedes primary fluid flow between the inlet to the outlet, and thus the valve is in a closed state. When the pressure from the diaphragm chamber is released, the valve transfers to the open state, and primary fluid is allowed to flow from the input to the output. One example of a diaphragm valve is described in U.S. Pat. No. 8,616,234, titled "FLUID CONTROL VALVE SYSTEM AND METHODS" filed on Dec. 3, 2008, however many other examples and embodiments are known.

A dry/pre-action system is a type of fire protection system that is commonly used, especially where a sprinkler system or a portion thereof may be exposed to sub-freezing temperatures. In such systems, a primary fluid source is separated by a valve from a piping and sprinklers arrangement known as the 'dry' side. The dry side is kept pressurized at positive pressure by a compressed secondary fluid, which in many applications comprises air. When a sprinkler or other fire sensor is activated, the positive pressure of the secondary fluid drops, causing the valve to 'trip', i.e. to transfer from a standby to an open state, and send primary fluid from the source to the dry side of the system.

Certain fire protection systems utilize the main valve controlling the fluid flow into the fire protection system as an activator of an alarm. When the valve is opened fluid is used directly or indirectly to activate an alarm, which in most cases is electric. A valve utilized to activate an alarm will be referred to as an 'alarm valve'.

Many fire protection standards for both wet and dry systems require an intermediate chamber between the inlet and the outlet, the intermediate chamber being connected to an alarm port. If primary fluid leaks behind the seal provided by the valve, such leak will be detected by leakage of primary fluid from the alarm port, and an alarm will be activated. In most existing valves rigged for dry/pre-action operation, an additional check valve is disposed between the primary valve and rest of the dry side, the check valve acting to define the intermediate chamber between the check valve and primary valve. Patent application WO 2008/051871 to Ringer discloses an intermediate chamber which is integral to the valve body. Other valves, such as disclosed by US patent publication number 20090272549 to Feenstra et al., incorporate a check valve within the valve body. However any fire protection system where activation is based on dropping pressure of secondary fluid in the dry side suffer from a common problem: a leakage in the dry side may cause a system failure, as the detection of fire may fail to activate the valve.

There is therefore a long felt, yet heretofore unanswered need for a compact valve with efficient sealing capability, be configurable in several ways, which may provide an alarm for leakage of fluid from piping in at least one side, and optionally from both sides of the valve, and further optionally to differentiate between leakage from the different sides.

SUMMARY

Therefore, it is a goal of the present invention to provide a valve having an alarm outlet for identifying leakage of either primary or a secondary fluid.

it is yet another goal of the present invention to provide a smaller spatial envelop of the valve when coupled with its associated trim.

It is yet another goal of the invention to provide a valve having a plurality of alarm ports, and more particularly to provide one alarm mechanism for a fast and wide opening of valve and a second alarm mechanism for minor leakage.

Those goals are met either in full or in parts by various embodiments and aspects of the invention.

To those ends, in an aspect of the present invention there is provided a fluid control valve comprising a valve body having a first inner surface at least partially defining a chamber, the chamber having an inlet and an outlet in communication with the chamber. An elongated seat member is disposed between the inlet and the outlet, the seat member having at least a first opening being in fluid communications with at least one alarm port. A diaphragm member is disposed within the chamber for controlling fluid communication between the inlet and the outlet, the diaphragm member having an upper surface and a lower surface, the lower surface comprising at least first, second and third spaced apart elongated sealing members, where the second member is at least partially interposed between the first and the third sealing members. The first and second sealing members define a first channel therebetween, and the second and third sealing members defines a second channel therebetween. The diaphragm member has a first state, equivalently referred to as activated or open state, permitting fluid communication between the inlet and the outlet and a second state, equivalently referred to as closed or standby state, wherein the elongated sealing members engages the seat member such that the first channel and a portion of the seat member at least partially define a first intermediate chamber which is in communication with the first opening, and the second channel and a portion of the seat at least partially define a second intermediate chamber. In some embodiments, the first and third sealing members each comprises an angled lip extending in a respective direction opposite from the second sealing member, the lip having a top and bottom portions. When the diaphragm moves in the seat direction, the lip edge will come in contact with the seat first. Following the edge contact, larger portions, and perhaps the whole the lip bottom will fully engage with the seat. Thus, when the diaphragm is in the closed state, at least a portion of the lip bottom of the first sealing member and the third sealing member respectively, and at least a portion of the second sealing member, all engage the seat. The three sealing members thus form two intermediate chambers in an arrangement that is referred to as "three seal model". A three seal model provides superior sealing capacity, particularly in cases of poor alignment between the diaphragm and the seat. Notably, after full engagement of a sealing element equipped with a lid, the sealed fluid will create pressure on the top portion of the lip, pushing the lip down further and providing additional compression of the lip bottom against the seat, thus improving sealing.

The first intermediate chamber or the second intermediate chamber, or a combination thereof are in communication with the first opening. While typically a duct exists between the opening and the alarm port, the port may be located sufficiently close so as to make such duct unnecessary, thus a direct connection of the port to the opening is contemplated as well as a duct providing fluid communications between the opening and the alarm port. In certain embodiments the first opening is coaxial to the port, and in others the opening is offset from the port axis.

In certain embodiments the at least one alarm port is disposed along the valve base 15, while in other embodiments the at least one alarm port is disposed along the valve side 25. Optionally, in embodiments where a first alarm port is disposed along one side of the valve, a second port in fluid communications with the first alarm port.

In optional embodiments the seat member has a second opening disposed therein, such that the first opening is in communication with the first intermediate chamber, and the second opening is in communication with the second intermediate chamber. Such embodiments shall be generally referred to as dual-chamber alarm valve.

In some preferred embodiments of the dual chamber alarm valve, the first opening is in fluid communications with a first alarm port, and the second opening is in fluid communication with a second alarm port. However, in other embodiments the first and second openings may be in fluid communication.

In some embodiments at least one alarm port is disposed at the side of the valve. In dual chamber alarm valve embodiments where each opening is in fluid communication to its respective alarm port, it is often desirable to have the alarm port coupled to the first chamber be disposed on one side of the valve, while the alarm port coupled to the second chamber is disposed on the opposite side of the valve.

In certain embodiments one or more alarm ports is disposed at the back of the valve, and such embodiments are optionally practiced in combination with other alarm ports disposed at one or more sides of the valve.

In certain embodiments more than a single alarm port is in fluid communications with at least one opening in the seat. Such embodiment may, by way of example, comprise of a first alarm port disposed on one side of the valve and a second alarm port disposed on the opposing side of the valve or at the back of the valve, wherein the first alarm port is in fluid communication with the second alarm port, and both the first and second alarm ports being coupled in fluid communications with at least one opening in the seat member.

In some embodiments, a compression spring is disposed in the diaphragm chamber, and extending between a spring support and the diaphragm, the spring urging the diaphragm into the second state.

An advantageous optional feature of the invention is enabled by using two intermediate chambers. Each of the chambers may be connected to an alarm port or ports, to provide for two separate alarm systems. The first alarm (#29, FIG. 8) is a water indicator and responds primarily to leakage. The second alarm (#27, FIG. 8) will be activated only in the case of valve activation. Thus, minor leakage may be indicated separately, and does not cause a fire alarm. This is advantageous as leakage in generally a minor event requiring maintenance, while a full fire alarm requires evacuation of premises, costly firefighters arrivals, and the like. Clearly, false alarms are costly and cause reduced trust in the system reliability.

Optionally the first alarm port is disposed at a side of the valve, and the second alarm is disposed at the opposite side of the valve or at the back of the valve.

Further optionally, additional alarm ports are provided, wherein the additional alarm ports are in fluid communication with the first or the second openings.

BRIEF DESCRIPTION OF THE DRAWINGS

The summary above, and the following detailed description will be better understood in view of the enclosed drawings which depict details of preferred embodiments. It should however be noted that the invention is not limited to the precise arrangement shown in the drawings and that the drawings are provided merely as examples.

FIG. 5A depicts a top view of the valve body and defines cross-section lines e-e and F-F. FIG. 5B is a cross section along line E-E and FIG. 5C is a cross section along line F-F.

FIGS. 6E and 6F depict views similar to FIGS. 6C and 6D respectively while utilizing a single sealing member having dual sealing lips.

FIGS. 10A and 10B depict views of the diaphragm of the valve of FIG. 9.

DETAILED DESCRIPTION

Figure 1:
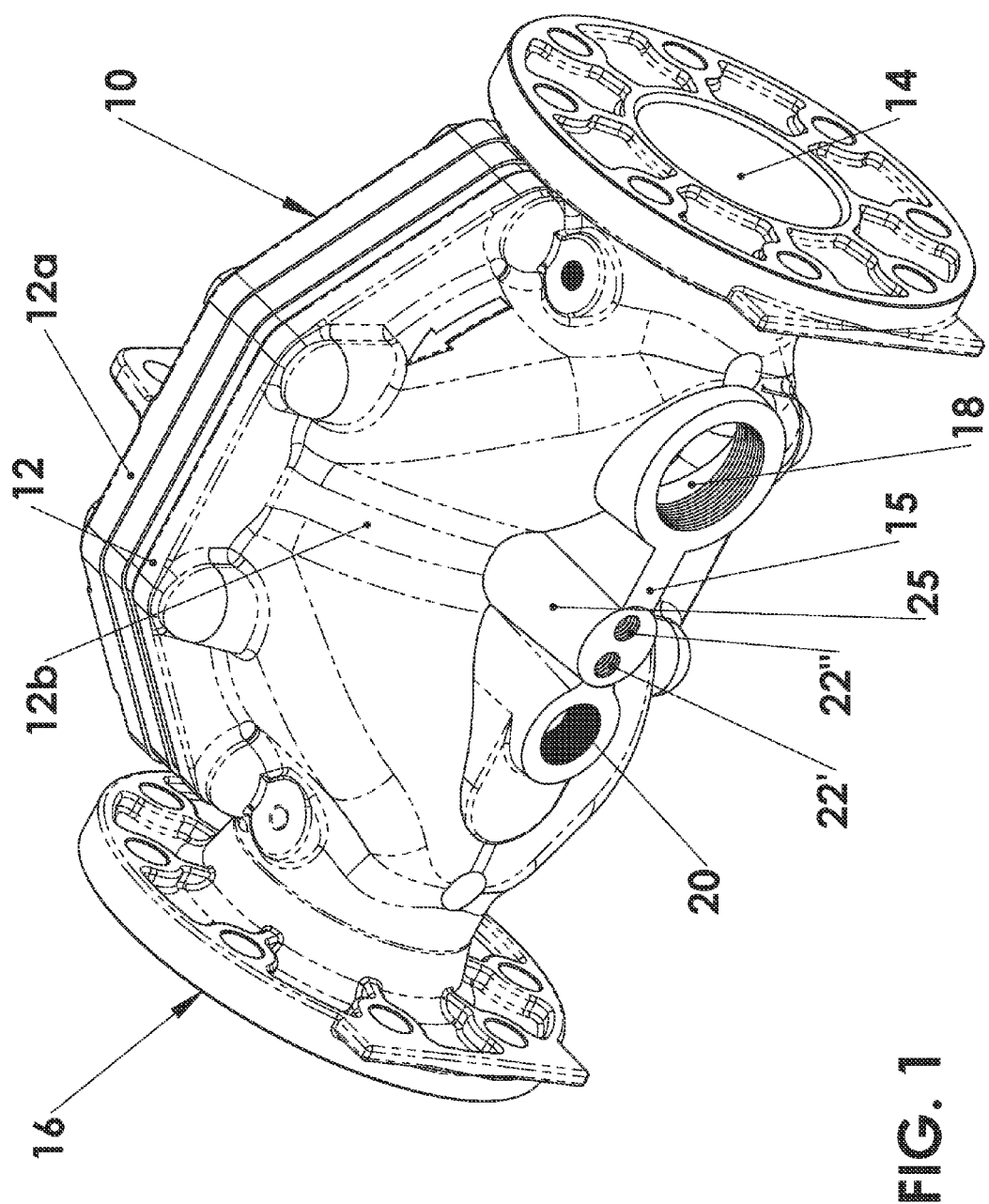
FIG. 1 is a perspective view of a control valve.

Shown in FIG. 1 is an illustrative embodiment of a control valve 10. The valve 10 includes a valve body 12 through which fluid can flow in a controlled manner. More specifically, the control valve 10 provides a diaphragm-type hydraulically controlled valve for preferably controlling the release and optionally mixture of a primary fluid such as water by way of example, to a fluid distribution arrangement such as sprinklers, nozzles, and the like. Accordingly, the control valve 10 can provide fluid control between fluids or various media including liquids, gasses or combinations thereof.

The control valve 10 is preferably configured for installation in a piping manifold or other piping assembly to separate and control fluid flow between a first fluid volume and a second fluid volume. The control valve 10 includes a cover 12a and a body portion 12b. The body portion 12b includes an inlet 14 and outlet 16. Each of the inlet and outlet 14, 16 of the body 12 includes an appropriate end fitting for coupling to a manifold. Thus, inlet 14 preferably includes a flanged end for coupling to a first fluid supply line, such as for example a water main, and the outlet 16 also preferably includes a flanged end for coupling to another pipe fitting such as, for example, a discharge pipe coupled to the fluid distribution arrangement. It is noted however that any convenient manner and type of connection may be used for coupling the valve to fluid piping systems.

The valve body 12 also includes a main drain 18 intended generally for draining the fluid from the system after valve activation. The valve body 12 further includes a system drain 20 for draining residual fluid from the system. In this aspect of the invention at least one alarm port 22 is also provided, however in most embodiments more than one alarm port is utilized, as shown by the examples by numeral 22' and 22". The location of the various ports and drains may be disposed at any convenient location and orientation, including at any side of the valve 10.

Figure 3:
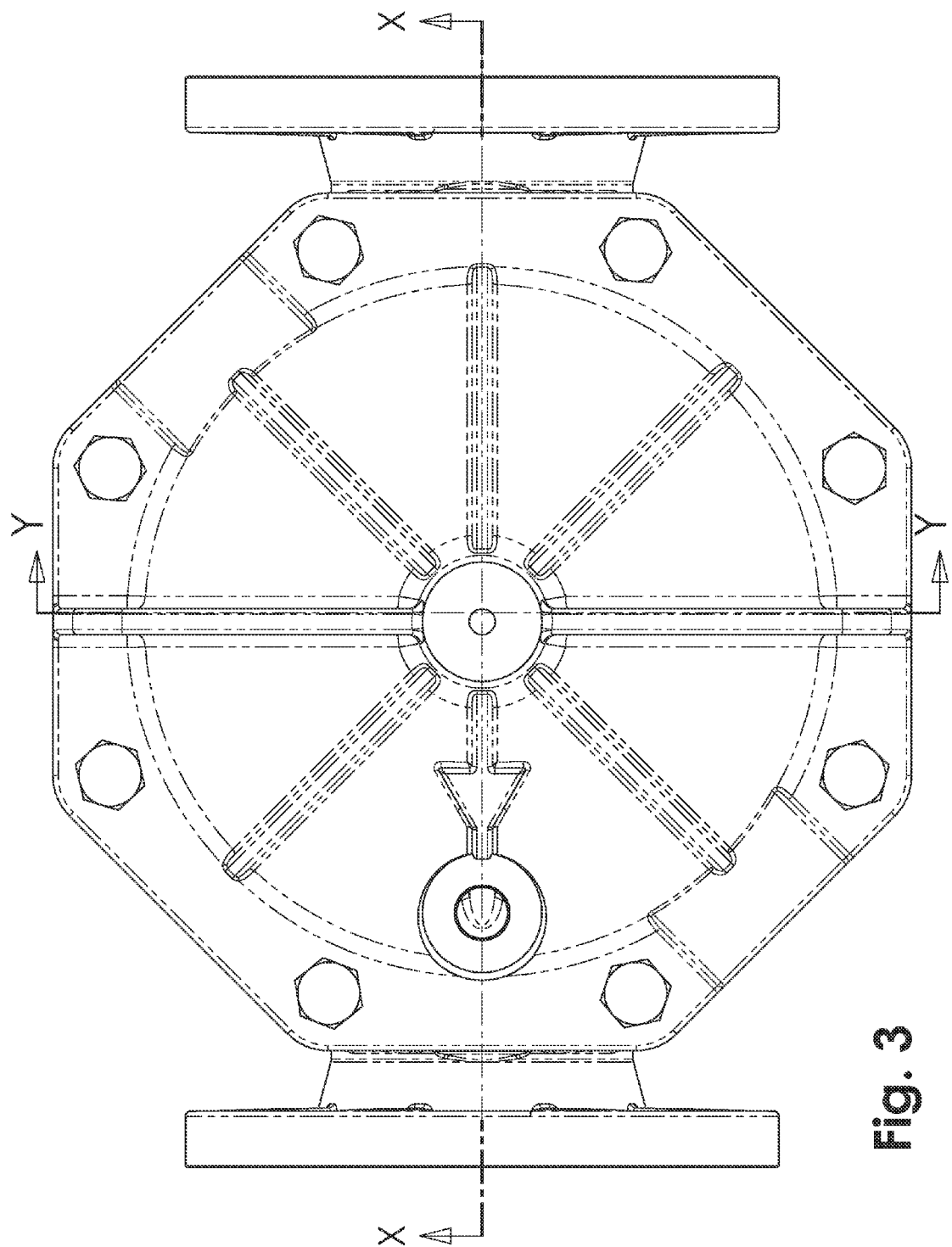
FIG. 3 is a top view of the valve of FIG. 1, showing directions of cross-sections shown in FIGS. 4 and 5.
Figure 4:
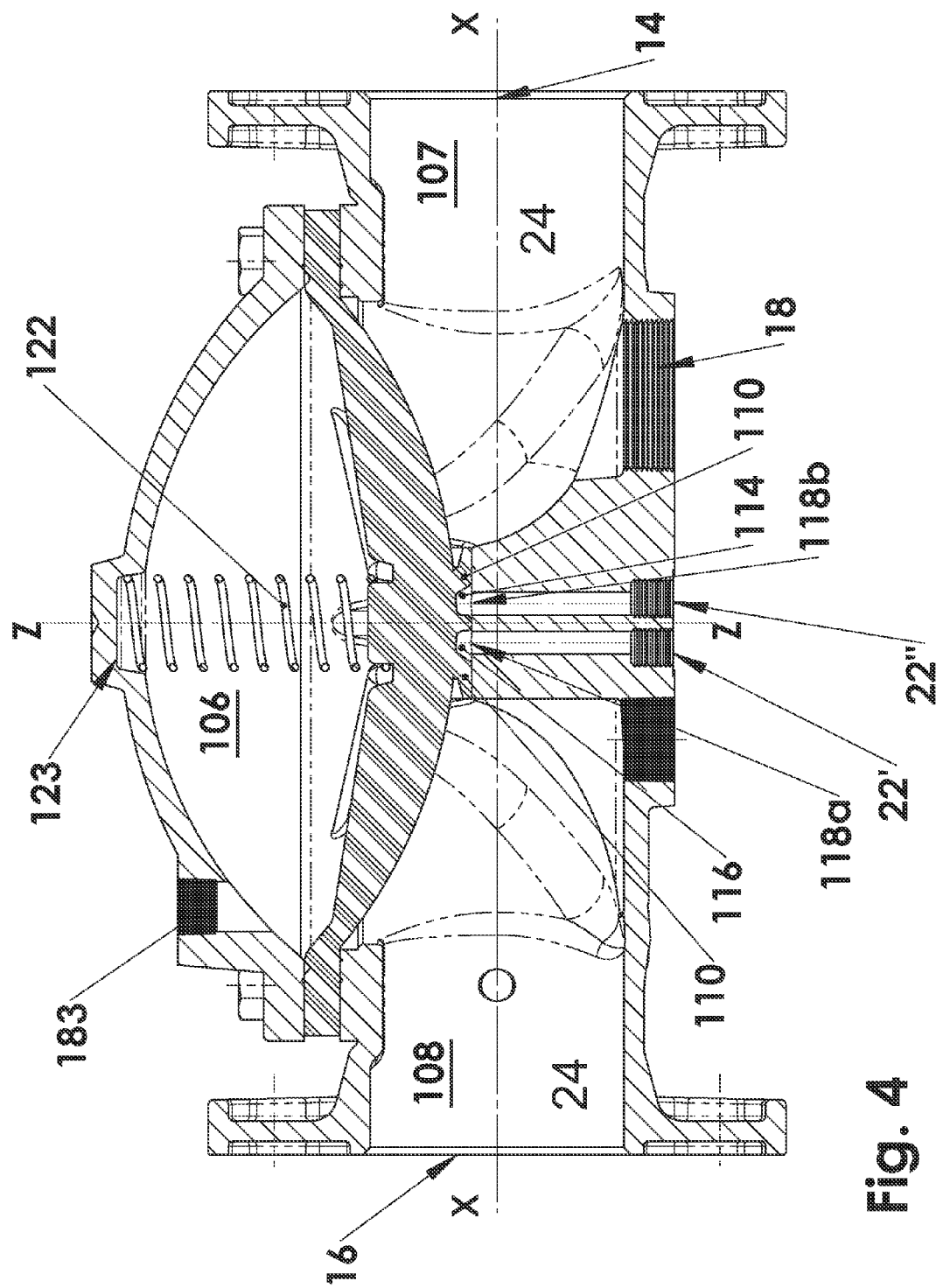
FIG. 4 is cross section of a valve along line X-X of FIG. 3.

For clarity, the reader is directed to FIGS. 3 and 4, to define the coordinate space of the valve, and certain directions thereof. Cross-section line X-X defines a longitudinal plane which contains a longitudinal axis extending from the input 14 and the output 16, and may be considered to divide the valve to a top portion and a bottom portion, the top portion being arbitrarily selected as the portion of the valve containing the diaphragm as seen in FIG. 4 by way of example. Axis line Z-Z, I combination with cross section line Y-Y define a lateral plane Y-Z which may be considered to divide the valve to an inlet side and an outlet side. The three axis are located to meet at an origin, and are orthogonal to each other. The term "front of the valve relates to the portion of the valve extending in the positive Z direction, or in the direction of the valve cover as seen from the origin, while the term "back of the valve" generally refers to portions of the valve body in the negative Z direction. The sides of the valve surfaces and features which lie in planes parallel to the X-Z plane, such as denoted generally by numeral 25, and more specifically in other drawings where one side is denoted 25a and the opposite side 25b. Notably, those notations are provided merely for facilitating understanding of the invention by providing directions relative to the origin, and do not denote a mandatory mounting, orientation, and/or arrangement of the valve or its components. Similarly, the shown embodiments are provided as examples and elements may be located on different sides and at different orientations, as will be clear to the skilled in the art in view of these specifications.

Figure 2:
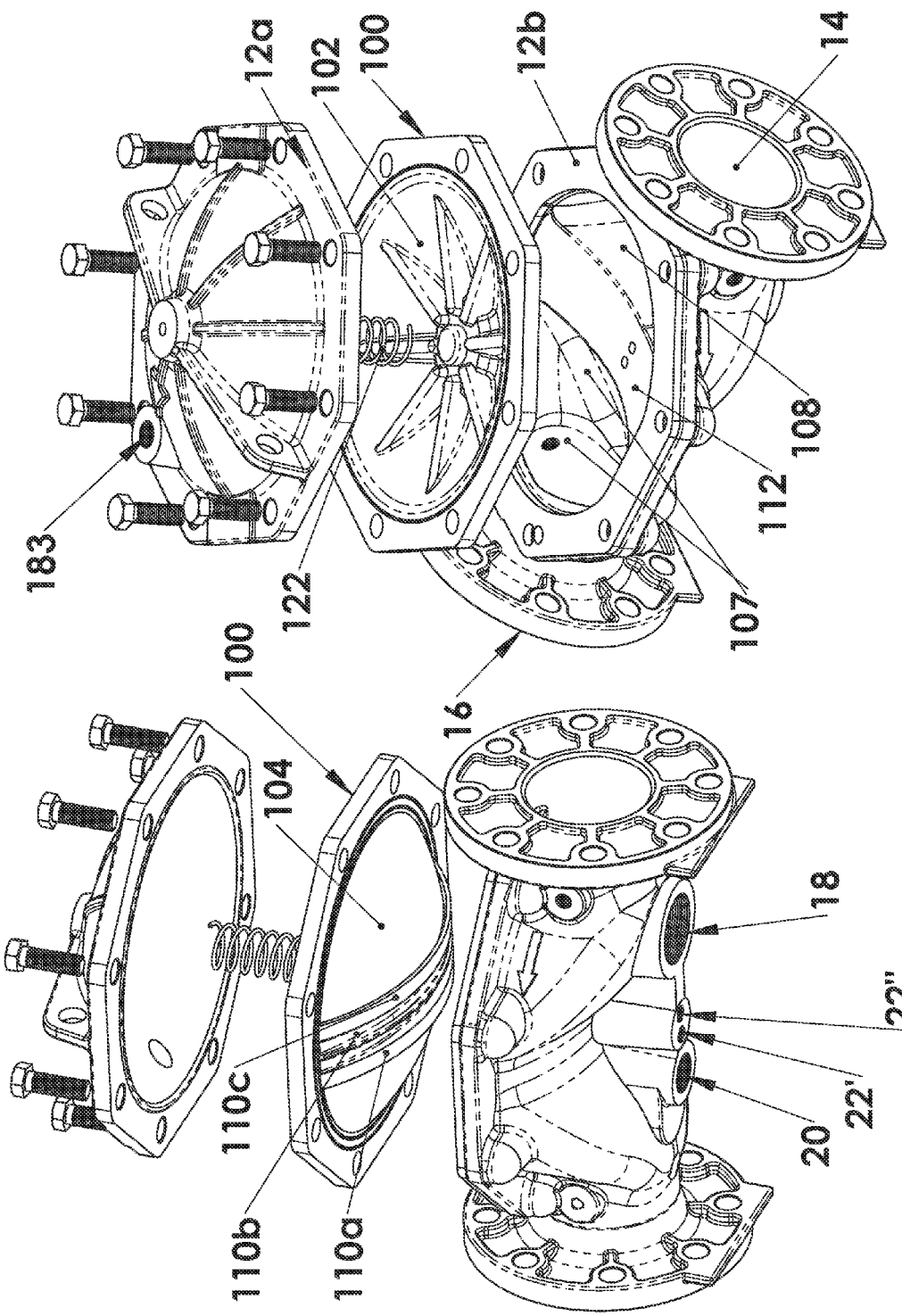
FIGS. 2A and 2B are exploded views of the valve of FIG. 1

FIGS. 2A and 2B are exploded views of the valve of FIG. 1 shown from two different perspectives. When the cover 12a and the valve body 12b are joined, a valve chamber 24 is defined between the valve body and the cover. An inlet chamber 107 is in communication with inlet 14, and an outlet chamber 108 is in communication with outlet 16. The inlet chamber 107 and the outlet chamber 108 are in communication with the valve chamber 24. A seat 112 is interposed between the inlet chamber 107 and outlet chamber 108. A flexible, preferably elastomeric diaphragm 100 is disposed within the valve chamber, the diaphragm having an upper surface 102 and a lower surface 104. The upper surface of the diaphragm and an inner surface of the cover form a diaphragm chamber 106. The lower surface of the diaphragm has at least a first 110a, second 110b, and a third 110c sealing members disposed thereon, the sealing members in combination are referred to by the numeral 110. A command port 183 is in fluid communication with the diaphragm chamber 106, and is capable of introducing or removing pressurized fluid therefrom.

Operationally, the diaphragm has two controllable states: an open state and a closed state, and transition between the states is controlled by the pressure in the diaphragm chamber. The skilled in the art will recognized that a plurality of intermediate states exist between the closed and open state, however for the purpose of these specifications, any state in which the diaphragm is disposed to allow fluid communications between the inlet 14 and outlet 16 is considered an open state. In the closed state the diaphragm chamber is pressurized and the sealing members 110 of the diaphragm engage a seat 112 within the valve body 12. The seat is preferably constructed or formed as an internal rib or middle flange within the inner volume of the valve chamber 24. When the sealing members engage the seat, they act to seal off fluid communication between the inlet chamber 107 and the outlet chamber 108. When the diaphragm chamber is not pressurized, the pressure of the primary and/or secondary fluid forces the diaphragm to its open position, and fluid communication is established between the inlet and the outlet. Generally, at least the portions of the sealing members contacting the seat are elastic to form a good seal.

Figure 6B:
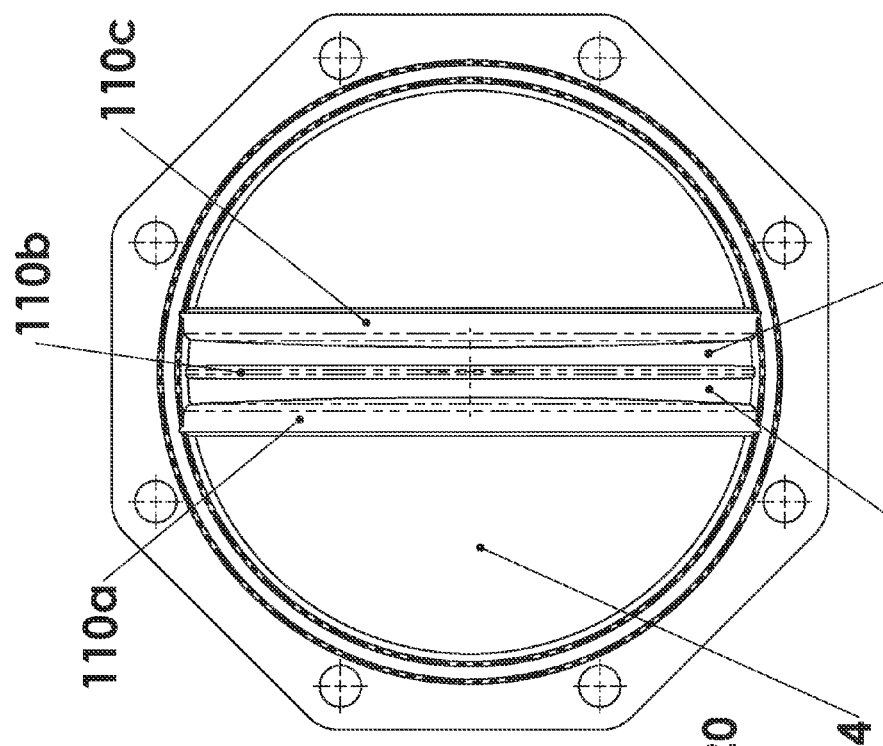
FIG. 6B is a bottom view of a diaphragm in accordance with some embodiments of the invention.

Each of sealing members 100a, 100b, and 100c have at least one protrusion 602, 603, and 604 respectively. The protrusions extend downwardly from the lower surface 104 of diaphragm 100, towards the seat. The protrusions are coupled directly or indirectly to the lower surface 104 of the diaphragm. Each of the downward protrusions has at least two side walls, the respective side walls of each protrusion being enumerated as 'a' and 'b' for their respective sealing member. As seen in FIG. 6B and in greater detail in FIG. 6D, a first channel 113a is formed between the first 110a and second 110b sealing members, the first channel being at least partially defined by the one side wall 602b of the outward protrusion 602 and the opposing side wall 603a of the outward protrusion 603. The channel bottom (which is located closer to the diaphragm than the ends of the protrusions distal from the diaphragm) may be an intersection of the two side walls, the lower surface 104 of the diaphragm 100, or an extension thereof, or a separate channel bottom member (not shown). A second channel 113b is similarly formed between the second 110b and third 110c sealing members, the channel being defined by the one side wall 603b of the outward protrusion 603 and the opposing side wall 604a of the outward protrusion 604. The second channel bottom may be the intersection of the two side walls, the lower surface 104 of the diaphragm 100, or an extension thereof, or a separate channel bottom member (not shown).

When the diaphragm is in the closed state the sealing members form a first 114 and a second 116 intermediate chambers at least partially defined by the first 113a and second 113b channels respectively, and by the seat 112.

At least one opening 118a is disposed on the seat. The opening is in communication with at least one alarm port 22'. The opening is situated such that it is in communication with at least one of the intermediate chambers 114, 116 when the diaphragm is the closed state. In certain embodiments, as shown by way of example in FIGS. 2A and 2B, FIG. 4, and others, two openings 118a and 118b are utilized, which are generally in communications with alarm ports 22' and 22".

In some embodiments the second sealing member comprises material of higher rigidity than the first and/or third sealing members. This feature prevents excessive deformation of the sealing members 110 against the seat 112.

The rigidity of the diaphragm is often enhanced by tangential ribs 120 disposed in the diaphragm, commonly on the upper surface 102 thereof. The tangential ribs improve pressure distribution of the sealing of the diaphragm sealing member against the seat 112, when the diaphragm chamber is pressurized. However I discovered that better sealing can be provided by pressure in the central portion of the diaphragm, acting separately, or in combination with the force excreted by the tangential ribs. The increased pressure is most advantageous for larger valves, and/or for valves operating at higher pressures. Thus, in certain embodiments, an aspect of the invention provides for a compression spring 122 disposed within the diaphragm chamber, the spring urging at least the center portion of the diaphragm towards the closed state. While the state of the art attempts to avoid such spring for reasons such as reducing part count, corrosion prevention, and simplifying assembly, I discovered that the spring so improves the performance of the valve such that lack thereof may be detrimental to proper sealing by the valve in almost all valves larger than 4". The spring comprises a compression spring 122 extending between a spring support 123 and the upper surface 102 of the diaphragm 100, the spring urging the diaphragm into the closed state.

The spring support may be embodied directly by the valve cover 12a, or by a separate support (not shown) in any convenient location within the valve.

FIG. 3 depicts a top view of the control valve of FIG. 1, and define two cross-section lines, X-X and Y-Y.

FIG. 4 is a cross section along the cross-section line X-X shown in FIG. 3, and more clearly show the arrangement of the sealing members 110. Attention is drawn to the two intermediate chambers 114 and 116 which improve the sealing between the inlet and outlet of the valve. FIG. 4 also depicts a disposition of two openings 118a which is in fluid communication with port alarm port 22' via duct 21', and opening 118b which is in fluid communications with alarm port 22' via ducts 21". FIG. 4 depicts the duct extending from the openings along the valve Y-Y axis, and towards the back 15 portion of the valve.

Figure 5:
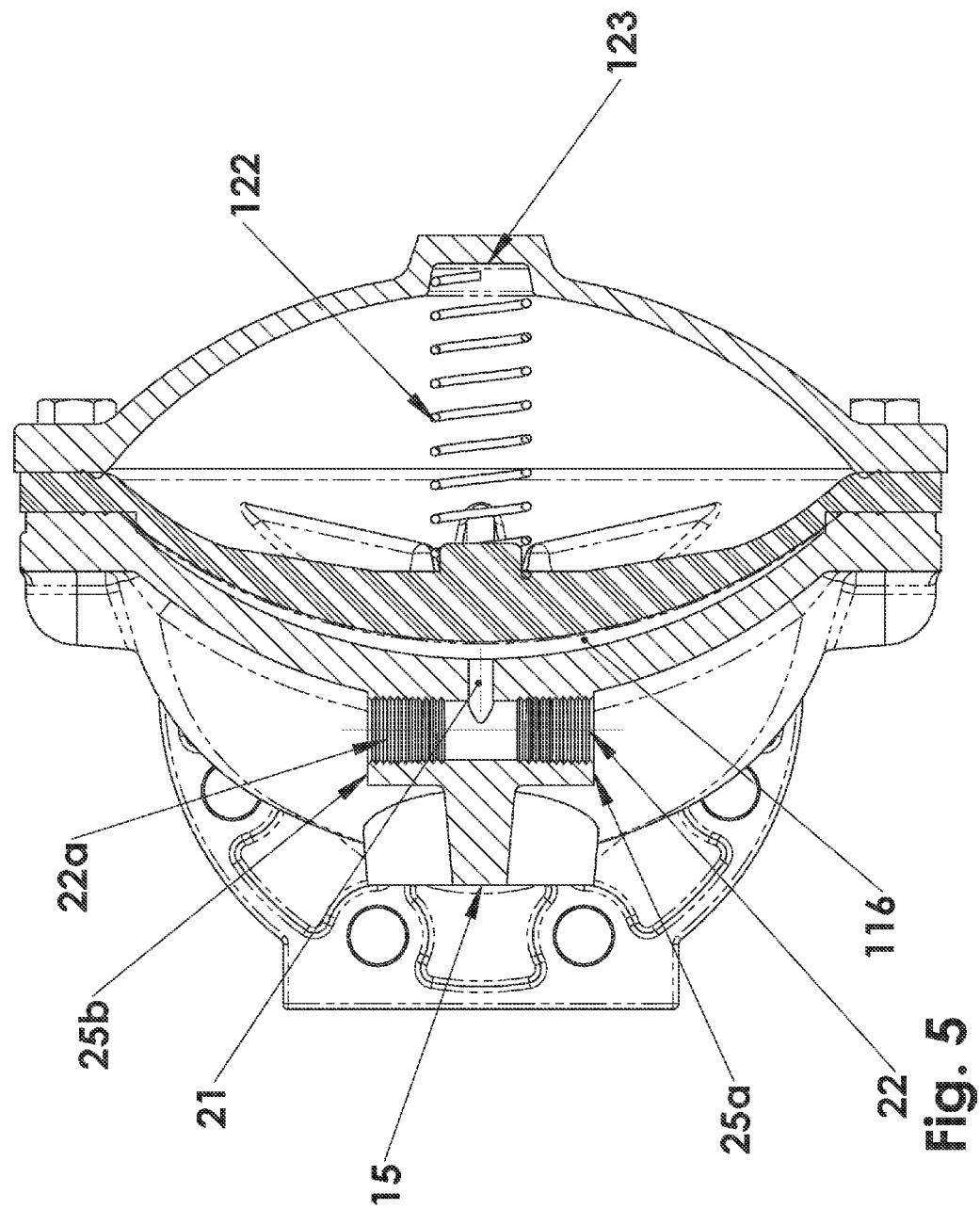
FIG. 5 is a cross section of a valve along line Y-Y of FIG. 3, showing an optional alarm port disposition.

Attention is now drawn to the difference between the arrangement of the alarm ports in FIG. 5 versus the embodiment depicted in FIG. 4. It is advantageous to reduce the overall spatial envelope that the valve and its associated trim occupies. To that end an aspect of the invention is depicted in FIGS. 5A-5C This optional embodiments provide the feature of placing the alarm port at the side of the valve. Such arrangement allows more compact profile and smaller envelope of the installation of the valve with associated trim.

FIG. 5 is a cross section of a valve along the cross section line Y-Y. The embodiment shown in FIG. 5 depicts an optional feature where the alarm port 22 is being disposed on the side 25a, and or 25b of the valve. The port 22 is in fluid communication with the opening 118a in the seat 112 via duct 21. Optionally a second alarm port 22a is provided, and is in fluid communications with the first port 22.

The alarm port 22 and optionally 22a may also be in fluid communications with more than one openings in the seat.

FIG. 5A is a top view of the valve body 12b, and define two cross section lines E-E and F-F. FIG. 5B is a cross section along the cross-section line E-E while FIG. 5C is cross-section along cross-section line F-F. It is seen that the opening 118a is in fluid communication with alarm port 22' via duct 21', while the opening 118b is in fluid communication via duct 21" to alarm port 22". Thus a separate alarm mechanism may be coupled to each of the respective alarm port and thereby to each of the intermediate chambers. This arrangement maintains separation between the two intermediate chambers.

The embodiment depicted in FIGS. 5A-C provide not only for compactness of the overall installation, but also to the increased safety and reliability, where small leaks in the diaphragm are handled by the alarm activator coupled to the intermediate chamber closer to the input, and only larger opening, such as in the case of actual fire, cause the second alarm activator to activate a true fire alarm. Alarms caused by small leaks may be thus treated as maintenance.

Optionally, a rate based alarm activator may be used on one or both of the alarm ports, such that rapid change causes a fire alarm, while small change causers a lower level alarm, notifying system maintenance people of a potential problem in the system.

Preferably in embodiments similar to the one shown in FIG. 5, alarm port 22' is disposed on one side 25a of the valve, while alarm port 22" is disposed on opposite to side 25b of the valve. It is noted however that in embodiments utilizing a side port only one alarm port need be disposed on the side, while the second alarm port may be disposed at the same side as the first alarm port, on the back of the valve, or on the opposing side. Other alarm ports may be coupled to the first or second alarm ports and to any combination thereof.

Figure 6A:
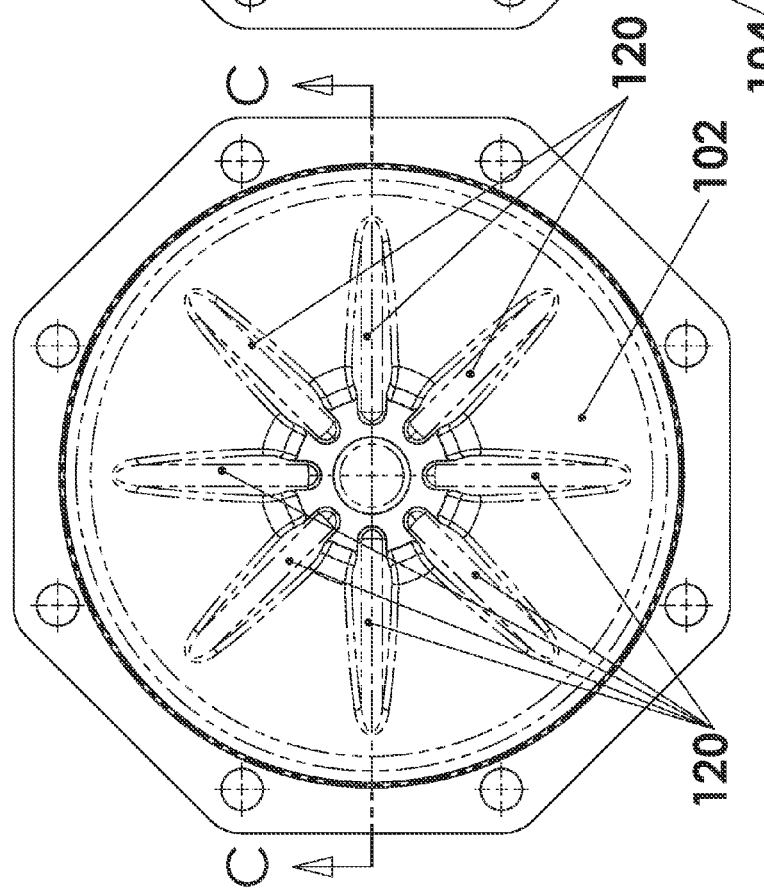
FIG. 6A depicts a top view of a diaphragm in one embodiment of the valve, and defining a cross section axis C-C.
Figure 6C:
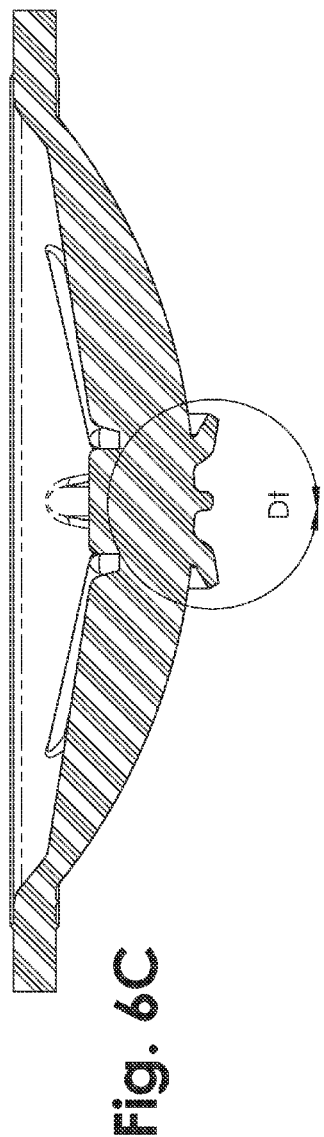
FIG. 6C depicts a cross section of the diaphragm along the axis line C-C.
Figure 6D:
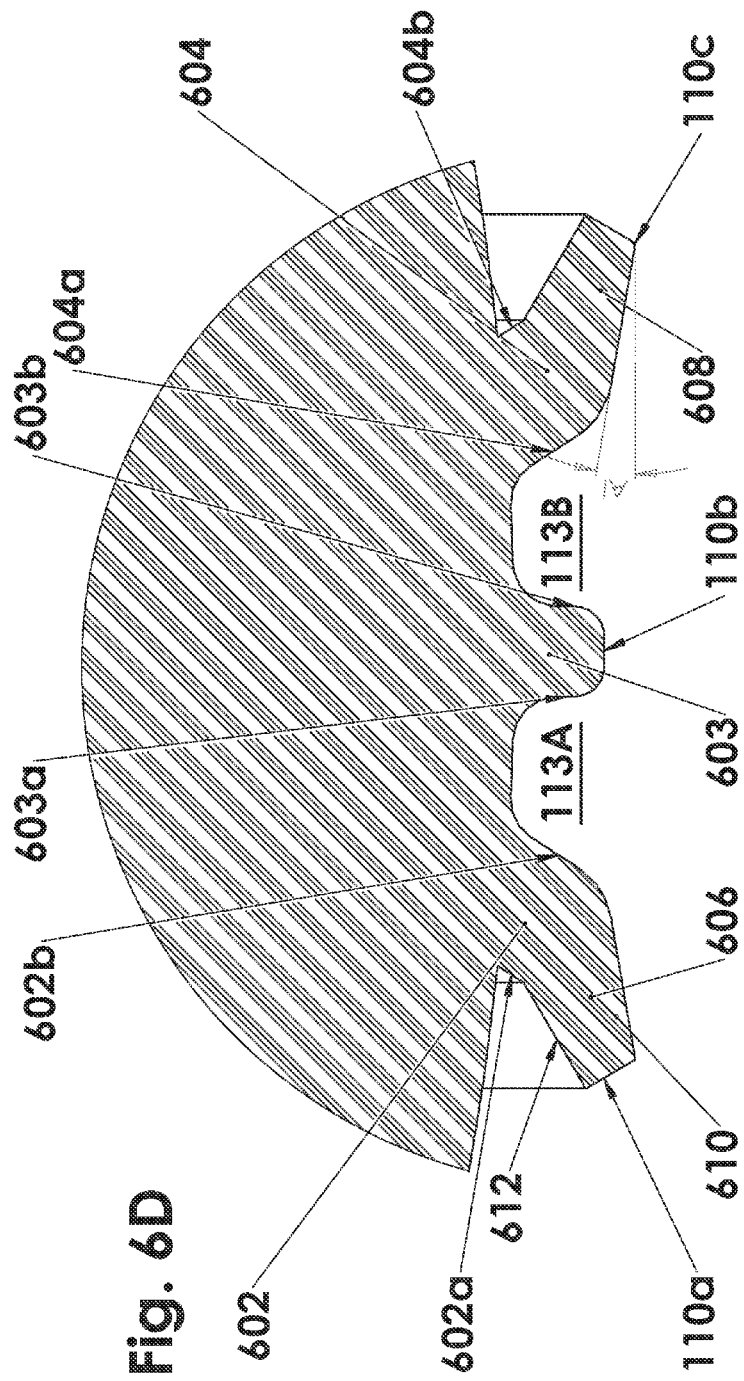
FIG. 6D is a detail view of the area circled by Dt in FIG. 6*c*.

FIG. 6A depicts a top view of an embodiment of the diaphragm, and defines a cross-section axis C-C. FIG. 6B is a bottom view of the diaphragm according to some embodiments. Sealing members 110a, 110b, and 110c are shown, including the channels 113a and 113b disposed therebetween. FIG. 6C is a cross-section view of the diaphragm along the axis C-C. The circle Dt designates details which are shown in FIG. 6D. FIG. 6D presents details of a preferred embodiment of the sealing members 110. In this embodiment the first 110a and third 110c sealing members each comprising a downward protrusion 602 and 604 respectively, the downward protrusions extend from the lower surface 104 of diaphragm 100 generally direction towards the seat 112. In the depicted embodiment each of the downward protrusions is coupled to an angled lip 606 and 608 respectively, however in certain embodiments only one of the two sealing members may be equipped with the angled lip, and in some embodiment no angled lip is used. The angled lips are disposed at the distal end of the protrusion, away from the diaphragm lower surface, and are angled away from the second sealing member 110b. Stated differently the angled lip is angled away from the Y-Z plane, and towards the inlet or outlet. The lip angle relative to the protrusion can vary in accordance to pressure applied thereto. In the depicted embodiments the lip is molded into the diaphragm and as it is pliable, it deforms to comply to the seat shape and provide a good seal.

The operation of the seal will be described below as it relates to the first sealing member 110a, however the skilled in the art would readily recognize that the same operating principles and methods also apply to the third sealing member when a lip is utilized therewith. Furthermore, as described below, the construction of the angled lip is beneficial to valves having conventional diaphragms with no intermediate chambers, or with single intermediate chamber, and the explanation provide herewith is applicable with some changes to such valves as well.

The angled lip 606 has a lower portion 610 and an upper portion 612, where when the valve is closed the upper portion 612 is exposed to pressure in the chamber 108, while the lower surface 610 is pressed against the seat 112.

Operationally, when the diaphragm is in the closed state, and the chamber 108 is pressurized, pressure is applied to the upper portion 612 of the angled lip 606. The elastic force exerted by the diaphragm 100 via the downward protrusion 602, and the pressure acting on the surface of the upper portion 612 of the angled lip 606 operates to push the lower portion 610 against the seat 112. The net force operating on the lower portion 610 is increased in the direction of the seat, providing greater sealing force. Notably, the sealing force increases as a result of increasing pressure applied to the sealing member by the fluid, providing additional sealing power to resist leakage caused by the added pressure. It is also noted that as disclosed herein relating to lips 606 and 608 may be beneficially utilized on conventional diaphragms, without requiring either one or both of the intermediate chambers 114, 116. Such lip may be formed at the inlet side, the outlet side, or both the inlet and outlet sides, of any diaphragm valve, including diaphragm valves a single intermediate chamber, or no chamber at all. FIG. 6E depicts a diaphragm similar to FIG. 6C and FIG. 6F depicts an area similar to FIG. 6D, while utilizing a single sealing member having dual sealing lips. In this embodiment the diaphragm 100 has a single sealing member with a protrusion 602 having two opposing lips 606A and 606B respectively. The embodiment shown in FIG. 6E also depicts an optional variation showing that the protrusion may be of very small thickness, but a clear distinction may be drawn by the edge or curvature cross-section formed between the lip and the protrusion. In certain cases the protrusion is so small that the most if not all of the protrusion is embodied within the vertical distance covered by the curvature.

Figure 7:
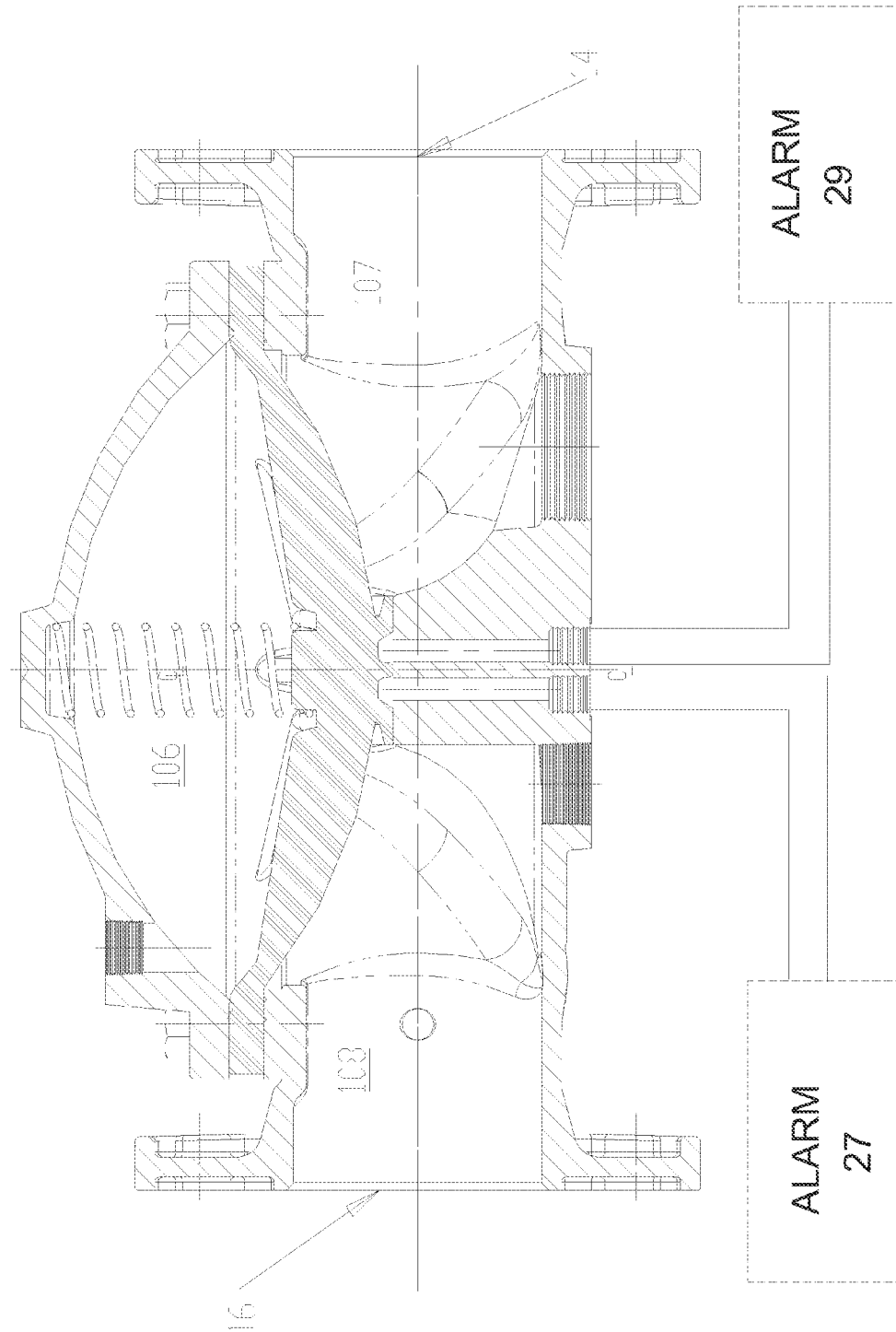
FIG. 7 depicts a typically rigged valve in a fire suppression system, and showing the optional features of an alarm system configuration.

FIG. 7 depicts an optional simplified external configuration of the valve being configured as an alarm valve, wherein alarm activator 27 is used as a fire alarm activator and alarm activator 29 is used primarily as leak detector. Notably, one or both of the alarms may respond differently to changing situations. Thus by way of example the alarm activator 27 coupled to the intermediate chamber 116 closer to the outlet side of the valve, may sense slowly dropping pressure and alert maintenance personnel that a leak may exist in the distribution side of the fire protection system. However the presence of water, a rapid drop in pressure, or rapid increase in pressure will cause fire alarm. Similarly, while the alarm activator 29 may be used only for sensing water leakage it may also be configured to respond to rapid changes such as pressure or water quantity, and be utilized as a backup fire alarm activator.

Figure 8:
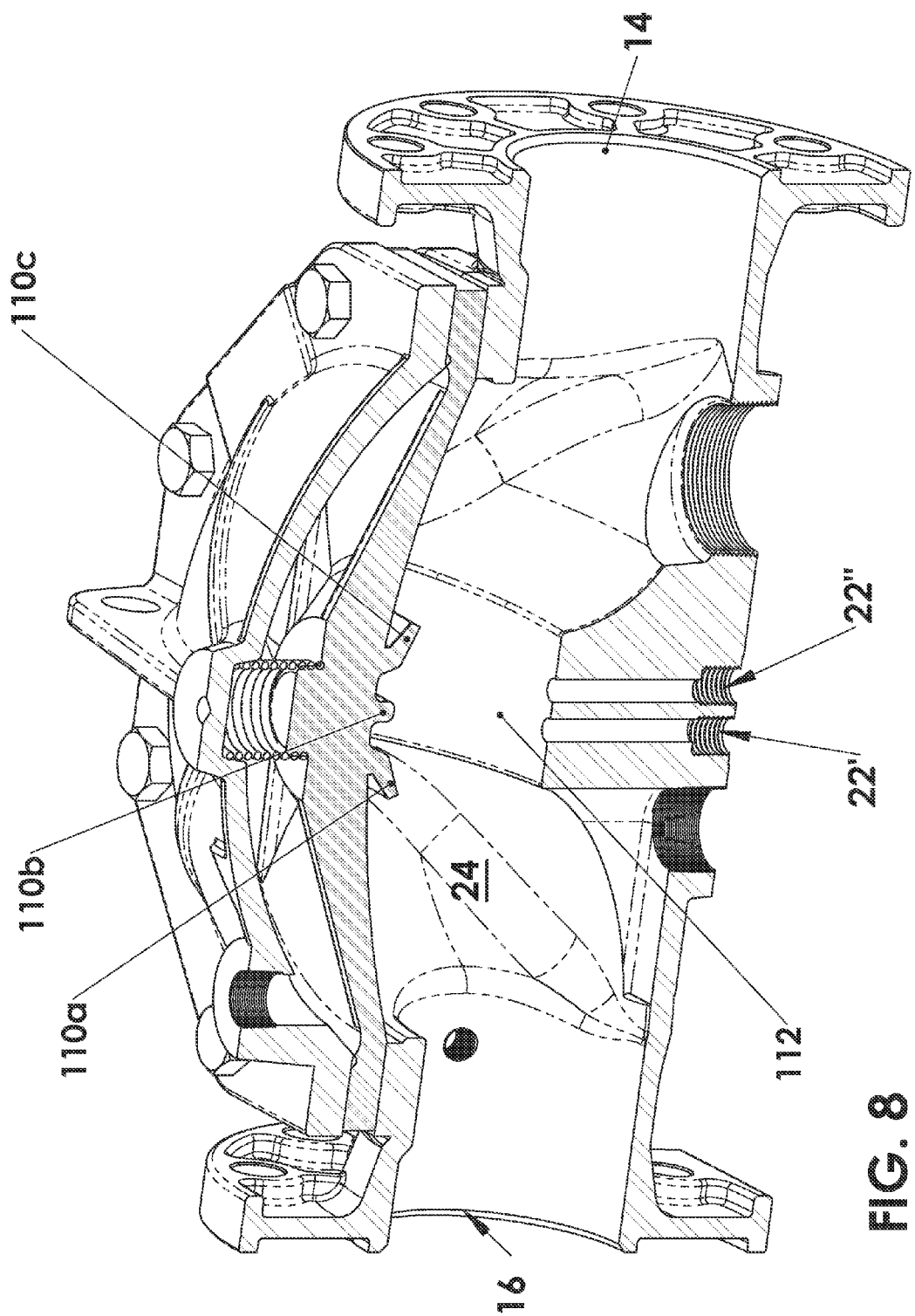
FIG. 8 depicts a cross-section of a valve with its diaphragm in the open state.

FIG. 8 is a cross section along cross-section axis B-B, showing the diaphragm in an open state.

Figure 9:
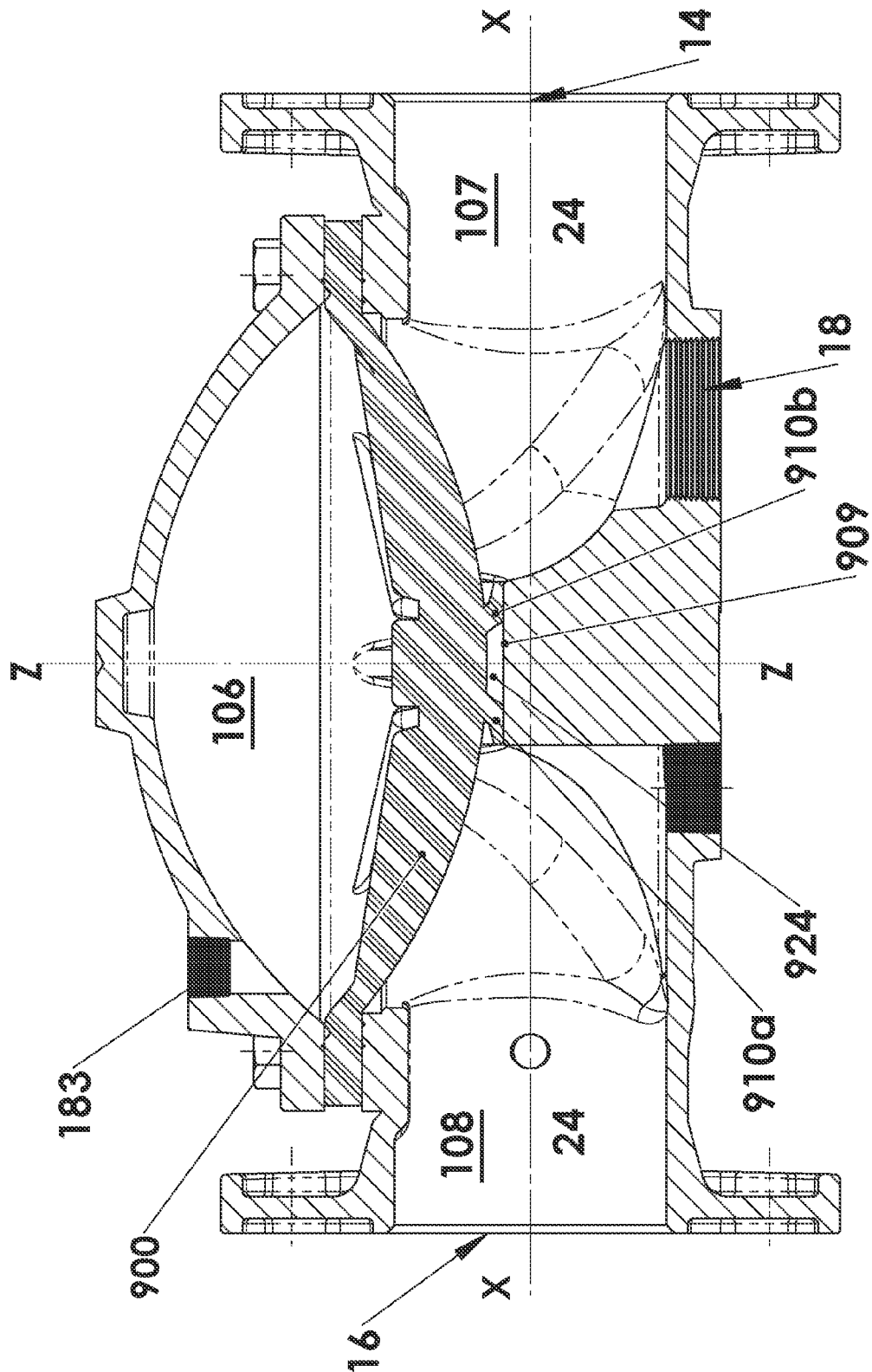
FIG. 9. depicts a cross-section of a diaphragm valve incorporating an additional aspect of the invention

Yet another aspect of the present invention is depicted in FIG. 9. In this embodiment the diaphragm 900 is shown as having two sealing member, while the rest of the parts of the valve are quite similar to embodiments shown and described in relation to other drawings. This aspect of the invention was first disclosed and described above as it applies to a diaphragm having three sealing members 110, the three sealing members partially define the two intermediate chambers 114 and 116 when the diaphragm is in a closed state. The skilled in the art would recognize that the angled lip aspect of the invention will advantageously apply to other diaphragms in many other diaphragm valve types. By way of example the angled lip will be beneficial to diaphragm valves such as valves having diaphragms with a single intermediate chamber 924 as depicted in FIG. 9, or with no intermediate chambers at all. The diaphragm may have no intermediate chamber at all by uniting the protrusions 902 and 904 (this embodiment is not shown). Protrusion 902 have side walls 902a, 902b, and protrusion 904 has side walls 904a and 904b respectively.

Thus in this aspect of the invention a diaphragm valve is provided, the diaphragm valve has a diaphragm 900 with at least one sealing member. Optionally two sealing members 910a and 910b are utilized, forming a channel therebetween, which when the valve is in the closed state would at least partially define boundaries of an intermediate chamber 924. When the sealing member engage the seat 112, it acts to seal off fluid communication between the inlet chamber 107 and the outlet chamber 108. When the diaphragm chamber 106 is not pressurized, the pressure of the primary and/or secondary fluid forces the diaphragm to its open position, and fluid communication is established between the valve inlet 14 and the valve outlet 16.

The sealing members 910a and 910b protrude generally towards the seat 909 from the bottom of the diaphragm 900. The sealing members are coupled directly or indirectly to the lower surface of the diaphragm 900 by protrusions 902 and 904 respectively. In the depicted embodiment having two sealing members, the sealing member closest to the inlet from the two sealing members is named the inlet sealing member, and the sealing member closest to the outlet from the two sealing member is named the outlet sealing member.

At least one of the sealing members have an angled lip coupled to the distal end of the protrusion, i.e. the protrusion end further from the bottom surface of the diaphragm. Optionally both sealing members 910a and 910b have angled lips 906 and 908 respectively.

In embodiments which utilize an angled lip coupled to the inlet sealing member, the angled lip is angled away from a plane crossing the inlet sealing member and parallel to the Y-Z plane, towards the inlet, and in embodiments which utilize angled lip coupled to the outlet sealing member, the angled lip is angled away from a plane crossing the outlet sealing member and parallel to the Y-Z plane, towards the outlet.

The angled lip aspect of this embodiment of the invention shall be described in relation to sealing member 910a and lip 906. The skilled in the art would readily understand how to apply the same principle to the opposite sealing member 910b, or in a single sealing member embodiment, to one or both sides of the sealing member (not shown). FIGS. 9, 10A and 10B shall be used as reference to facilitate understanding of this feature, in combination with the other figures and the rest of these specifications.

The angled lip 906 is angled away from the protrusion, towards the chamber which it seals. Stated differently, the lip is angled away from the Y-Z plane of the valve, and towards the inlet chamber if it is disposed on the inlet side of the sealing member, or towards the outlet chamber if it is disposed on the outlet side of the sealing member.

The angled lip 906 has a bottom portion 910 and a top portion 912. When the valve is in closed state, the lower surface of the angled lip is pressed and forms a seal against the seat 909. The lip angle relative to the protrusion can vary in accordance to pressure applied thereto. In the depicted embodiments the angled lip is molded as part of the diaphragm and as it is pliable, it deforms to comply to the seat shape and provide a good seal, however other construction such as a hinged lip, and the like are also contemplated. In the open state, the lower surface of the angled lip is disposed at an angle, presented as angle A in FIG. 10B. Notably the angle of the lip at rest is a matter of technical choice.

Operationally, when the diaphragm is in the closed state, and the chamber which the lip seals is pressurized, pressure is applied to surface of the upper portion. The elastic force exerted by the diaphragm 900 via the downward protrusion of the sealing member 910a, and the pressure acting on the upper surface of 912 of the angled lip 906 operates to push the lower surface of the angled lip against the seat 909. The net force operating on the lower surface is increased in the direction of the seat, providing greater sealing force. Notably, the sealing force increases as a result of increasing pressure applied to the sealing member by the fluid in the chamber, thus providing a better seal. Similar mechanism operates on the angled lip 908, if the valve is so equipped, The angled lip may be applied to the inlet side of the valve, the outlet side of the valve, or to both. It is noted that in fire control systems in which the downstream side of the system is pressurized, an angled lip seal may be beneficial to provide better seal and maintain such pressurization to prevent false activation of the system.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

I claim:

1. A fluid control valve comprising:
   a valve body having a first inner surface at last partially defining a chamber the chamber comprising a valve inlet and a valve outlet in communication with the chamber
   an elongated seat member disposed between the inlet and the outlet, the seat member having at least a first opening disposed therein, the opening being in communication with at least one alarm port; and,
   a diaphragm member disposed within the chamber for controlling communication between the valve inlet and the valve outlet, the diaphragm member having an upper surface and a lower surface, the lower surface comprising at least partially pliable first, second and third spaced apart elongated sealing members, the first and second sealing members defining a first channel therebetween, and the second and third sealing members defining a second channel therebetween, the diaphragm member being movable at least between a first state permitting fluid communication between the inlet and the outlet and a second state wherein the elongated members engage the seat member such that the first channel and at least a portion of the seat define a first intermediate chamber, and the second channel with at least a portion of the seat define a second intermediate chamber.

2. The control valve as claimed in claim 1 wherein the first intermediate chamber or the second intermediate chamber, or a combination thereof are in communication with the first opening.

3. The control valve of claim 1 wherein the seat further having a second opening disposed therein, wherein the first opening is in communication with the first intermediate chamber, and the second opening is in communication with the second intermediate chamber.

4. The control valve as claimed in claim 3, wherein the second opening is in communication with a second alarm port.

5. The control valve as claimed in claim 4, wherein the first alarm port is disposed on a first side of the valve and the second alarm port is disposed on the opposite side of the valve.

6. The control valve as claimed in claim 3 wherein the second opening is in communication with the at least one alarm port.

7. The control valve as claimed in claim 1 wherein the second sealing member comprises material which is more rigid than the material of at least one of the first and third sealing members.

8. The control valve as claimed in claim 1, further comprising a compression spring disposed in the diaphragm chamber, and extending between a spring support and the diaphragm, the spring urging the diaphragm into the second state.

9. The control valve as claimed in claim 1, wherein at least one of the first and third member comprises a protrusion extending toward the seat, the protrusion having an angled lip disposed at the distal end thereof, the angled lip being angled away from the second sealing member.

10. A fluid control valve comprising:
    a valve body having a first inner surface defining a chamber the chamber comprising a valve inlet and a valve outlet in communication with the chamber;
    an elongated seat member disposed between the inlet and the outlet; and,
    a diaphragm member disposed within the chamber for controlling fluid communication between the valve inlet and the valve outlet, the diaphragm member having an upper surface and a lower surface, the lower surface comprising at least a first sealing member, the diaphragm member being movable between at least a first state permitting fluid communication between the inlet and the outlet and a second state wherein the first elongated sealing member engages the seat member;
    wherein the at least first sealing member having an inlet side and an outlet side, the sealing member comprises a protrusion coupled to the lower surface of the diaphragm and extending away therefrom towards a distal end; and, a first lip disposed at or about the distal end and forming an edge or a curvature with the protrusion, the lip being angled relative to the protrusion, towards the inlet if it is disposed on the inlet side of the sealing member, or towards the outlet if it is disposed on the outlet side of the sealing member.

11. A valve as claimed in claim 10, wherein the first lip extends in the direction of the inlet.

12. A valve as claimed in claim 10, wherein the first lip extends in the direction of the outlet.

13. A valve as claimed in claim 10, further comprising a second lip disposed on the side of the sealing member opposite the side of the first lip, and angled in an opposite direction from the first lip relative to the Y-Z plane.

14. A valve as claimed in claim 10, further comprising a second sealing member disposed on the lower surface of the diaphragm and extending substantially parallel to the first sealing member the first and the second sealing members in combination with the seat member, at least partially define an intermediate chamber.

15. A valve as claimed in claim 14 wherein the first sealing member is an inlet sealing member, and wherein the first lip is disposed on the inlet side of the first sealing member, and extending therefrom in the direction of the inlet.

16. A valve as claimed in claim 14 wherein the first sealing member is outlet sealing member, and wherein the first lip is disposed on the outlet side of the first sealing member, and extending therefrom in the direction of the outlet.

17. A valve as claimed in claim 14 wherein the first sealing member an inlet sealing member and the second sealing member is an outlet sealing member;
the first lip being disposed on the inlet side of the first sealing member and angled therefrom in the direction of the inlet;
further comprising a second lip disposed on the side of the second sealing member, and angled therefrom in the direction of the outlet.

18. A fluid control alarm valve comprising:
a valve body having a first inner surface at least partially defining a chamber, the chamber having an inlet and an outlet in fluid communication with the chamber;
a seat having disposed between the inlet and the outlet;
a first, second, and third sealing members are disposed to impede fluid passage from the inlet to the outlet;
a first intermediate chamber is defined at least partially by the first and second sealing members, and a second intermediate chamber is defined between at least the second and third sealing members;
a first opening is disposed in the first intermediate chamber and a second opening being disposed in the second intermediate chamber;
wherein the first opening is in fluid communications with a first alarm activator, and the second opening is in fluid communication with a second alarm activator.

19. A valve as claimed in claim 10, wherein the lip is integral to the protrusion and/or to the diaphragm.

20. A valve as claimed in claim 10 wherein the protrusion and the lip are integral to the diaphragm.

21. A valve as claimed in claim 13 wherein the second lip is integral to the protrusion and/or to the diaphragm.

* * * * *